United States Patent Office 3,409,585
Patented Nov. 5, 1968

3,409,585
PIGMENT CONCENTRATE
Hugh J. Hagemeyer, Jr., and Raymond L. Eter, Jr., Longview, Tex., assignors to Eastman Kodak Company, Rochester, N.Y., a corporation of New Jersey
No Drawing. Continuation of application Ser. No. 321,691, Nov. 6, 1963. This application Mar. 10, 1967, Ser. No. 622,367
3 Claims. (Cl. 260—41)

ABSTRACT OF THE DISCLOSURE

Pigment concentrates and a process for their manufacture consisting essentially of distinct pigment particles coated with at least one amorphous material having a viscosity as measured at 150° C. between about 5,000 and about 300,000 cps., selected from homopolymers of propylene, butene-1 and hexene-1 and copolymers including block copolymers of at least 60% by weight propylene with ethylene, butene-1 and hexene-1. The pigment concentrates are prepared by providing a 5–20% by weight solution of at least one of the amorphous materials in a substantially non-polar, hydrocarbon solvent, gradually adding solid particulate pigment to said solution while agitating to form a solution-suspension and gradually introducing a non-solvent for said amorphous material into the solution-suspension while agitating to cause the amorphous material to form a coating on the individual pigment particles.

The novel pigment concentrates have been found particularly useful in the coloring of various types of polymeric resinous materials in that they provide unique pigment dispersions therein.

---

This application is a continuation of application Ser. No. 321,691, filed Nov. 6, 1963, now abandoned.

This invention broadly relates to improved systems for dispersing particulate materials in polymeric masses, and especially concerns their manufacture and use in the form of color concentrates comprising particulate pigments encapsulated and rendered non-agglomerative by certain amorphous materials.

While the present invention is useful for filling and extending polymeric masses in general, it can be adequately described by reference to its use in the pigmentation of polyolefins, and such description shall henceforth be given for the sake of simplicity rather than limitation. The term "pigment" as hereinafter used includes all kinds of particulate organic and inorganic coloring and filler materials.

Color concentrates comprising pigmented carriers such as thermoplastic resinous materials are conventionally blended with polymeric materials including polyolefins to impart color thereto. In the use of such concentrates, the homogeniety or uniformity of the pigment dispersion in the final product depends, of course, on the uniformity of the pigment dispersion in the pigment carrier. For example, if agglomerated pigment particles are present in the concentrate, agglomerated pigment will exist in the final article and detract from its appearance, i.e., render the color grainy and non-uniform. While in most instances the prior art concentrates have been satisfactory, they have not overcome the agglomeration problem in the coloring of polypropylene and other polymers which wet pigment particles only poorly and prevents proper dispersal thereof.

Objects of the present invention, therefore, are: to produce polymeric articles having uniform dispersals of pigment therein and almost a complete absence of agglomerates; to provide free-flowing, easily handled color concentrates exhibiting improved pigment dispersions and amenable to low-cost blending with resin systems; and to provide color concentrates useful for coloring a large variety of resinous materials, thereby reducing the number of concentrate types heretofore required for large-scale and varied coloring operations.

These and other objects have been achieved according to the present invention through the discovery that a large variety of particulate materials including organic and inorganic pigments of all types when treated in a certain manner become essentially non-agglomerative and easily extendable into polymers, particularly polyolefins.

This treatment is carried out as follows: One or more amorphous polyolefins such as amorphous polypropylene or amorphous block copolymers of propylene and other olefins is dissolved in a non-polar solvent such as mineral spirits or xylene at about 5 to 20 weight percent solids. The solid particulate pigment is then added slowly to the stirred solution. A ratio of about 0.5 to 10 parts of pigment to 1 part of amorphous polymer is normally used depending upon the type of pigment employed. The amorphous polymer is then precipitated onto the surface of the solid pigment particles by adding a polar non-solvent such as acetone or alcohol (methanol, ethanol, etc.) to the solution. Good agitation and slow addition of this non-solvent to the polymer solution is necessary to prevent encapsulation of pigment agglomerates rather than individual particles. It is noted that the addition of the pigment to the polymer solution and the cautious addition of the non-solvent to the polymer solution are essential steps in the process of encapsulating the individual pigment particles. For example, should the polymer solution be added to the non-solvent, large agglomerations of the pigment will result. It is further noted that electron microscopic study of the pigment encapsulated according to the present invention, reveals that about 75% of the pigment particles are individually rather than collectively encapsulated. This is a most noteworthy achievement and provides a new dimension for polyolefin coloring. The polymer solution is generally at room temperature during the encapsulating, but may be lowered to facilitate precipitation of the polymer. In many cases the precipitation should be done under high shear conditions such as encountered in a Gaulin homogenizer, colloid mill, ball mill, or like apparatus. The encapsulated pigment is then filtered and dried. Antioxidants and other additives may be added thereto so that only one material need be blended with the polymer.

The encapsulated pigments thus obtained present many advantages including: excellent dispersions of all pigments, which allows less of the pigment to be used for a given depth of shade; color control of various pigments and combinations is easy and reproducibility of pastel shades is excellent; simple blending of the encapsulated pigments with the polyolefin is all that is necessary for good dispersion; no dusting problem is encountered—such encapsulated pigments being very easy to handle and ship; higher concentrations of the pigment in the finished polymer is possible since no low concentration master batch is needed; this method is much cheaper than the usual Banbury or powder methods of pigmentation; and superior dispersion results in all polyolefins such as polyethylene, polypropylene, polyallomers, etc.

The amorphous linear polyolefins such as amorphous polypropylene and amorphous block copolymers of propylene and other olefins useful in the present invention are prepared by head-to-tail polymerization by ionic polymerization techniques. They have the unique characteristic of being relatively Newtonian in flow properties when compared to polystyrene, polyethylene, polymethyl methacrylate and other amorphous random copolymers such as ethylene-propylene rubber (EPR) and polyisobutylene, and wet or coat solid pigment particles easily and thoroughly. Other useful encapsulating polymers include amorphous homo-polymers of butene-1 and hexene-1 and copolymers of at least about 60% by weight of propylene with other olefins such as ethylene and butene-1. Should a lower percentage of propylene be employed in these copolymers the fluidity thereof necessary for wetting of the pigment would not be attained.

The amorphous polymers useful in the present invention may vary in viscosity from about 5,000 to about 300,000 cps. at 150° C. with the preferred viscosity in the range of from about 10,000 to about 200,000 cps. at 150° C. It is noted that these polymers should be non-tacky at room temperature for the most effective use of the present invention.

These amorphous (heptane extractable) polymers may be prepared by any of a variety of well known processes and catalysts. For example, amorphous polypropylene may be prepared by methods A and B as follows:

(A) A mixture of 500 ml. of heptane, 5.0 ml. of ethyl aluminum sesquibromide and 3.75 ml. of tetra-2-ethylhexyl titanate was prepared in a nitrogen atmosphere. While stirring this mixture, propylene gas was introduced over a period of about 2 hours. The temperature rose to about 60° C. and was maintained between 50–60° C. The product contained about 65% amorphous polymer extractable with hexane and having a viscosity at 150° C. of about 25,000 cps.

(B) An 82-gallon stirred autoclave is purged with propylene and charged with 40 gallons of mineral spirits. Twenty grams lithium aluminum hydride, 22 g. of sodium fluoride and 80 g. of titanium trichloride are charged to the reactor and propylene is added to bring the pressure to 100 p.s.i.g. The vessel is heated to 150° C. and propylene is fed to bring the pressure to 450 p.s.i.g. After six hours at 450 p.s.i.g. and 150° C., unreacted propylene is vented. The product contains about 15% amorphous polymer extractable with hexane and has a viscosity at 150° C. of about 11,000 cps.

The amorphous block copolymers of propylene and ethylene are produced by ionic polymerization methods and have a random arrangement of the methyl groups about the asymmetric carbon atoms. The ethylene content of the copolymer should not be over about 40 percent by weight and preferably not over about 30 percent by weight.

The block copolymers may be prepared, for example, either by direct polymerization to essentially 100% amorphous polymer or by hexane extraction of gross polyallomer. Many variants of these procedures are known and the block copolymers produced thereby may be employed in the present invention.

In general, it may be said that all catalyst systems produce some amorphous block copolymers. The amount of amorphous copolymer produced varies with the individual system. Such systems are comprised of a compound of an element from the fourth to sixth subgroups of the periodic table and a metal, alloy, metal hydride, or organometallic compound from the first to third groups. The compounds from the first to third groups include aluminum alkyls, alkali metal alkyls, zinc, or magnesium alkyls, aluminum alkyl halides, aluminum alkyl hydrides, alkali metal aluminum hydrides, alkali metal aluminum halides, and the like. The compounds of elements from the fourth and sixth subgroups include the halides of titanium and zirconium as well as the alkyl esters of orthotitanic acid and compounds of chromium and vanadium.

A catalyst which produces large amounts of amorphous block copolymers can be prepared from aluminum compounds of either $R_2AlX$ or $RAlX_2$ or mixtures of these types where R represents an alkyl or aryl hydrocarbon radical and X represents a halogen, and titanium compounds of either $Ti(OR)_4$, $Ti(OR)_x(OCOR)_{4-x}$, $TiX_x(OCOR)_{4-x}$ or $TiX_x(OR)_{4-x}$ type where R represents an alkyl hydrocarbon radical containing 4–14 carbon atoms and X represents a halogen. Typical aluminum compounds used include $Et_2AlBr$, $EtAlCl_2$, $Et_3Al_2Cl_3$, etc. Typical titanium compounds used includes tetrastearyl titanate, tetrabutyl titanate, and isoproxy titanium stearate.

The direct polymerization process was carried out as follows:

A mixture of 500 ml. of heptane, 5.0 ml. of ethyl aluminum sesquibromide and 3.75 ml. of tetra-2-ethylhexyl titanate was prepared in a nitrogen atmosphere. While stirring this mixture, propylene gas was introduced for 28 minutes followed by introduction of ethylene gas for two minutes. The temperature rose to about 60° C. and was maintained between 50–60° C. throughout the reaction period. Four separate additions of propylene and ethylene were made as above over a two-hour period. The solid amorphous block copolymer obtained had an ethylene content of about 16%.

The polyallomer preparation and heptane extraction process may be carried out as follows:

An 82-gallon stirred autoclave is purged with propylene and charged with 40 gallons of mineral spirits. Twenty g. of lithium aluminum hydride, 22 g. of sodium fluoride and 80 g. of titanium trichloride are charged to the reactor and propylene is added to bring the pressure to 100 p.s.i.g. The vessel is heated to 150° C. and propylene is fed to bring the pressure to 450 p.s.i.g. After six hours at 450 p.s.i.g. and 150° C., unreacted propylene is vented and the vessel repressured to 50 p.s.i.g. with dry nitrogen. The vessel is flushed with nitrogen three times and then ethylene gas is added to a pressure of 50 p.s.i.g. Polymerization is sustained until the desired ethylene content is reached. The polymer solution is concentrated, extruded into strands, and chopped into pellets. The pellets are extracted with hexane at 60° C. for 12 hours. The hexane is removed from the amorphous block copolymer and the polymer is pumped into silicone lined boxes. The amorphous block copolymer is substantially solid.

Evaluation of dispersion

The encapsulated pigments as prepared by this invention were evaluated as to dispersion qualities as follows:

(1) The encapsulated pigment was extended in conventional polyolefin by extrusion to a pigment concentration of 1%. A microscope slide was prepared from this extended material by placing a small amount of the material between two glass slides, heating to a temperature of 150–200° C. and placing a 3000-gram weight on the top of the slide until the polymer had cooled. The slides prepared in this manner were then observed under 100× magnification and photomicrographs were taken for permanent record. Quality was judged according to:
 (a) Degree of uniformity of pigment particles
 (b) Absence of large pigment particles. An overall rating of 1 to 10 was given with the Number 1 being excellent and designating a very uniform dispersion of small pigment particles, and the Number 10 being very poor and designating very un-uniform dispersion with many large particles present.
(2) The extended material was then extruded into flat film and the film evaluated as to:
 (a) Uniformity of color
 (b) Absence of pigment specks
 (c) Observed under the microscope as in above.

Again, an over-all rating from 1 to 10 was placed upon the dispersion with Number 1 being the most excellent.

The following specific examples will further illustrate the invention:

Example 1

A solution of 20 grams of amorphous polypropylene, viscosity at 150° C.=16,000 cp., in 180 grams of mineral spirits, was prepared with stirring in a 2-liter flask. Titanium dioxide pigment, 80 grams, was then added slowly with good agitation. Acetone was added to this slurry in small increments. Good agitation was maintained throughout the precipitation step. After cooling, the encapsulated pigment was filtered and washed with acetone and dried. The encapsulated pigment was white, free-flowing, and yielded an excellent dispersion in a subsequent extension in polyethylene and polypropylene (Dispersion Quality in Film=Grade 2).

Example 2

Example 1 was repeated using an amorphous linear block copolymer of ethylene and propylene instead of amorphous polypropylene. Viscosity at 150° C.=140,000 cp., percent ethylene=17.6%. The encapsulated pigment obtained was white, free flowing and yielded an excellent dispersion upon extension in a polyolefin (Dispersion Quality In Extended Polymer=Grade 2; Dispersion Quality in Film=Grade 1).

Examples 3–7

Example 1 was repeated using the various pigments with the results of the evaluations shown in Table I below.

TABLE I

| Ex. | Pigment Used | Dispersion Quality In— | |
|---|---|---|---|
| | | Extended Polymer | Film |
| 3 | Copper Phthalocyanine (Zulu Green). | Good—3 | Excellent—2. |
| 4 | Chlorinated Copper Phthalocyanine (Zulu Blue). | Good—4 | Good—3. |
| 5 | Watchung Red (trade named diazo red pigment). | Excellent—2 | Excellent—2. |
| 6 | Cadmium Yellow (CdS) | do | Do. |
| 7 | Carbon Black | Good—4 | Good—3. |

Examples 8–12

Examples 8–12 were run according to the procedures of Examples 3–7, respectively, using the amorphous copolymer of Example 2. The results are given in Table II below.

TABLE II

| Ex. | Pigment Used | Dispersion Quality In— | |
|---|---|---|---|
| | | Extended Polymer | Film |
| 8 | Zulu Green | Good—3 | Excellent—2. |
| 9 | Zulu Blue | do | Do. |
| 10 | Watchung Red | Excellent—2 | Do. |
| 11 | Cadmium Yellow | do | Do. |
| 12 | Carbon Black | Good—3 | Good—3. |

Example 13

A 15% solution of amorphous polypropylene, viscosity 150° C.=18,300 cp. was prepared and circulated through a Gaulin two-stage homogenizer. The polymer was kept in solution by heating the feed pot and the block on the Gaulin homogenizer. Cadmium orange pigment was added to the circulating solution to yield a pigment-to-polymer ratio of 5 to 1. Acetone was then injected slowly into the recirculating slurry. Addition of acetone was continued until the pigment particles had been encapsulated. The solid was then filtered, washed with acetone and dried. A free-flowing, easily handled material was obtained and when extended with polymer an excellent dispersion results (Dispersion Quality in Extended Polymer=Grade 2; Dispersion Quality in Film=Grade 1).

The invention has been described in detail with particular reference to preferred embodiments thereof but it will be understood that variations and modifications can be effected within the spirit and scope of the invention as described hereinabove and as defined in the appended claims.

We claim:

1. Pigment concentrate consisting essentially of distinct pigment particles coated with at least one amorphous material having a viscosity as measured at 150° C. between about 5,000 and 300,000 cps., selected from the group consisting of homopolymers of propylene, butene-1 and hexene-1 and copolymers including block copolymers of at least 60% by weight of propylene with olefins selected from the group consisting of ethylene, butene-1 and hexene-1, wherein at least about 75% by weight of the coated pigment comprises individual particles.

2. A non-tacky pigment concentrate consisting essentially of distinct pigment particles coated with at least one amorphous material having a viscosity as measured at 150° C. between about 5,000 and about 200,000 cps., selected from the group consisting of homopolymers of propylene, butene-1 and hexene-1 and copolymers including block copolymers of at least 60% by weight of propylene with olefins selected from the group consisting of ethylene, butene-1, and hexene-1 wherein at least about 75% by weight of the coated pigment comprises individual particles.

3. A process for pigmenting polyolefins consisting essentially of blending thereinto particulate materials comprising pigment coated with at least one non-tacky amorphous polyolefinic material selected from the group consisting of homopolymers of propylene, butene-1, hexene-1 and copolymers including block copolymers of at least 60% by weight of propylene with olefins selected from the group consisting of ethylene, butene-1 and hexene-1, said material having a viscosity as measured at 150° C. of between about 5,000 and about 300,000 cps., wherein at least about 75% by weight of the coated pigment comprises individual particles.

References Cited

UNITED STATES PATENTS

| 2,701,211 | 2/1955 | Taylor et al. | 106—198 |
| 3,060,145 | 10/1962 | Moscrip | 260—41 |

FOREIGN PATENTS 879,587  10/1961  Great Britain.

ALLAN LIEBERMAN, *Primary Examiner.*